No. 627,290. Patented June 20, 1899.
J. H. BISHOP
PREPAYMENT GAS METER.
(Application filed Feb. 27, 1899.)
(No Model.) 5 Sheets—Sheet 2.
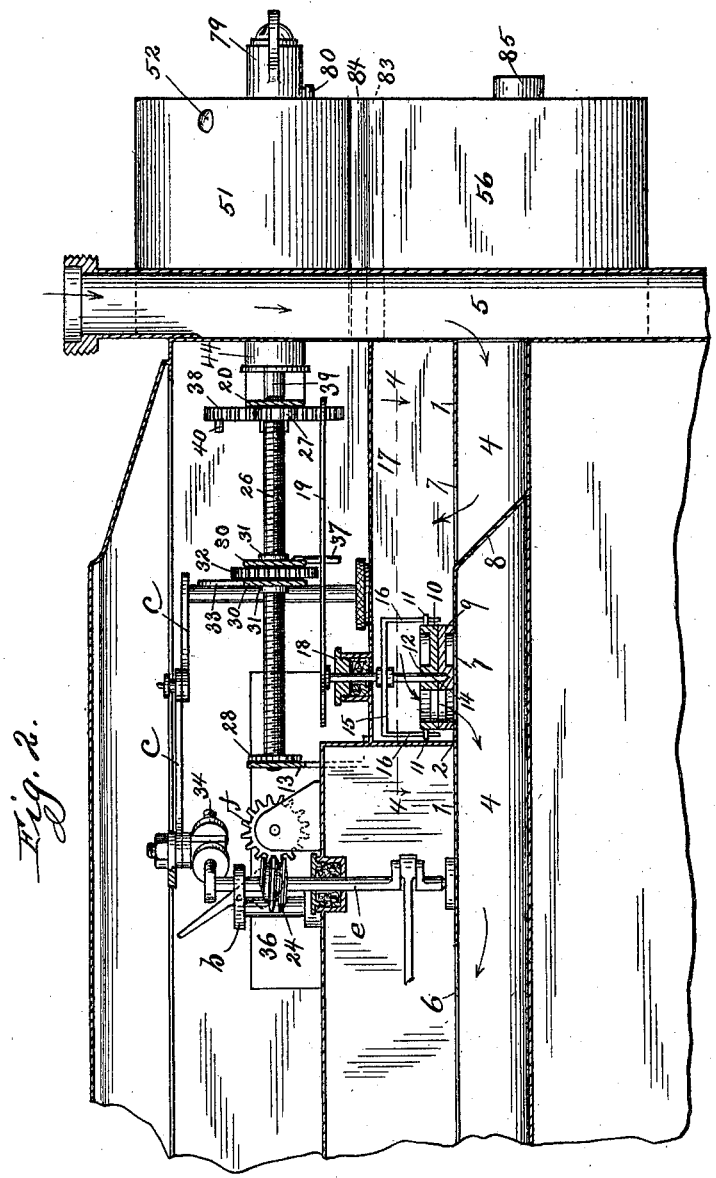
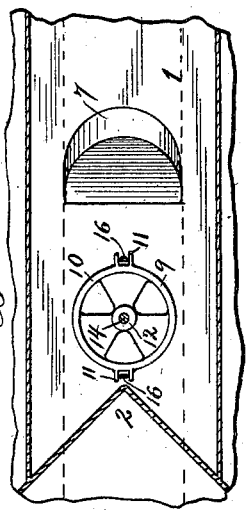
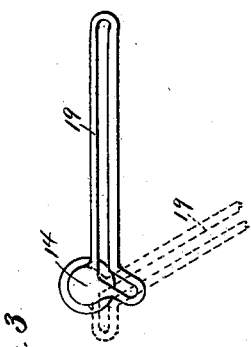
Witnesses:
W. J. Jacker.
H. E. Evans
Inventor:
J. Howard Bishop
By O. A. Bishop
Atty.
THE NORRIS PETERS CO., PHOTO-LITHO., WASHINGTON, D. C.

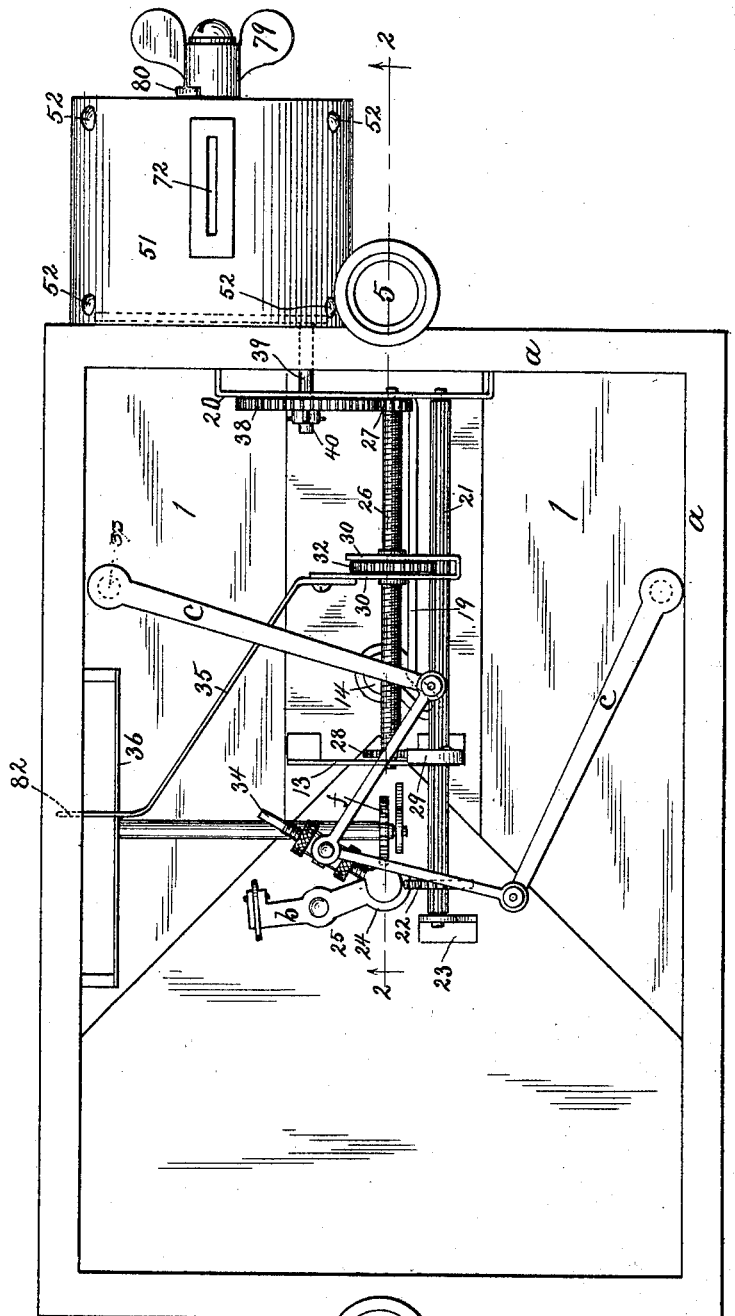

No. 627,290. Patented June 20, 1899.
J. H. BISHOP
PREPAYMENT GAS METER.
(Application filed Feb. 27, 1899.)
(No Model.) 5 Sheets—Sheet 3.
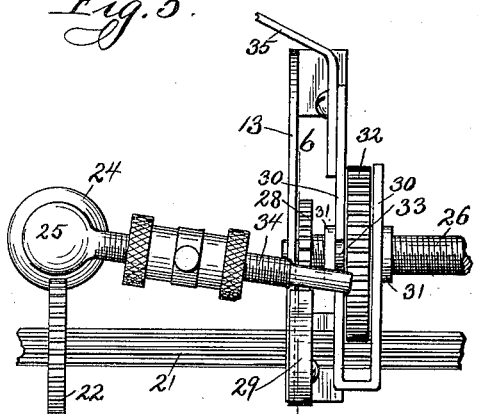
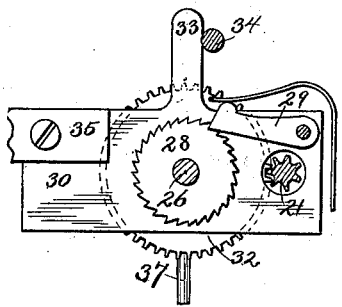
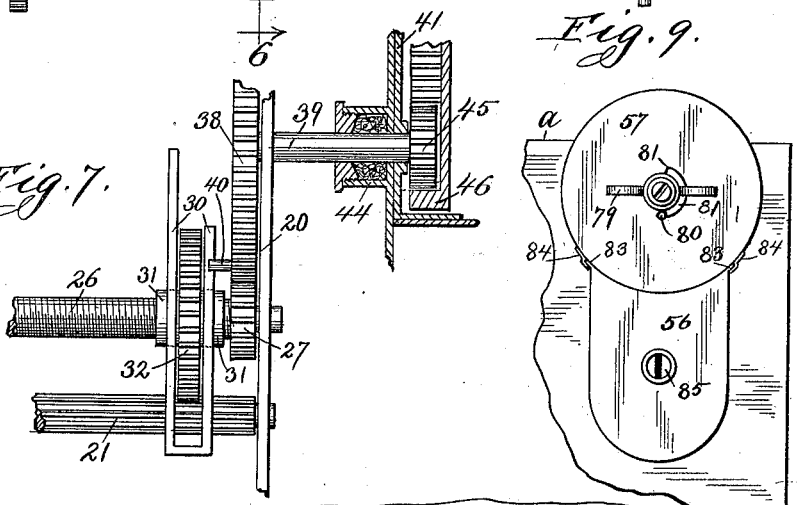
Witnesses:
V. J. Jacker
H. E. Evans.
Inventor:
J. Howard Bishop
By O. A. Bishop
Att'y No. 627,290. Patented June 20, 1899.
J. H. BISHOP
PREPAYMENT GAS METER.
(Application filed Feb. 27, 1899.)
(No Model.) 5 Sheets—Sheet 4.

Witnesses:
R. J. Jacker.
H. E. Evans.

Inventor:
J. Howard Bishop
By C. A. Bishop
Atty.

THE NORRIS PETERS CO., PHOTO-LITHO., WASHINGTON, D. C.

No. 627,290. Patented June 20, 1899.
J. H. BISHOP
PREPAYMENT GAS METER.
(Application filed Feb. 27, 1899.)

(No Model.) 5 Sheets—Sheet 5.

Witnesses
R. J. Jaeker.
H. E. Evans.

Inventor:
J. Howard Bishop
By O. A. Bishop.

UNITED STATES PATENT OFFICE.

JOSEPH HOWARD BISHOP, OF CHICAGO, ILLINOIS.

PREPAYMENT GAS-METER.

SPECIFICATION forming part of Letters Patent No. 627,290, dated June 20, 1899.

Application filed February 27, 1899. Serial No. 707,069. (No model.)

*To all whom it may concern:*

Be it known that I, JOSEPH HOWARD BISHOP, a citizen of the United States, residing at Chicago, in the county of Cook, State of Illinois, have invented a new and useful Improvement in Prepayment Gas-Meters, of which the following is a specification.

My invention is related to coin-controlled vending-machines; and the objects of my invention are, first, to vend gas or other vapor in large or small quantities by depositing a coin of the required size in a receptacle prepared to receive it; second, to construct a vending device that can be connected with any of the meters now in use at a less cost than any now made; third, to construct a gas-vending mechanism so arranged that it can be readily set to deliver gas at any price from five cents to three dollars and fifty cents per thousand feet without adding or removing any gearing-wheels from the meter or without removing the meter from where it is installed. I accomplish these objects by a mechanism illustrated in the accompanying drawings, in which—

Figure 10:
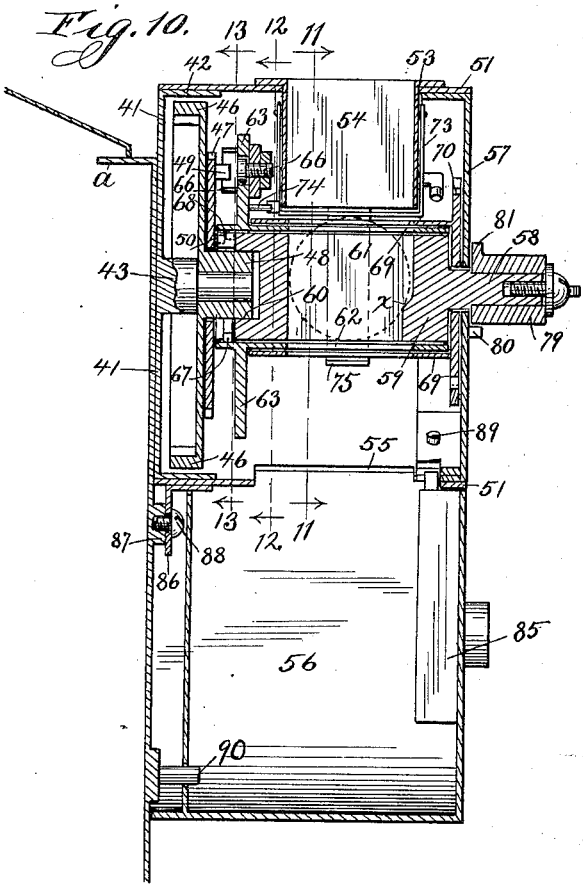
Figure 11:
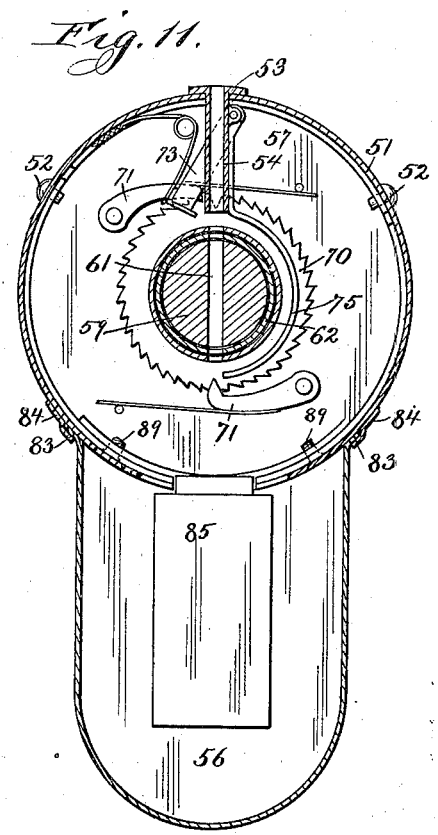
Figure 12:
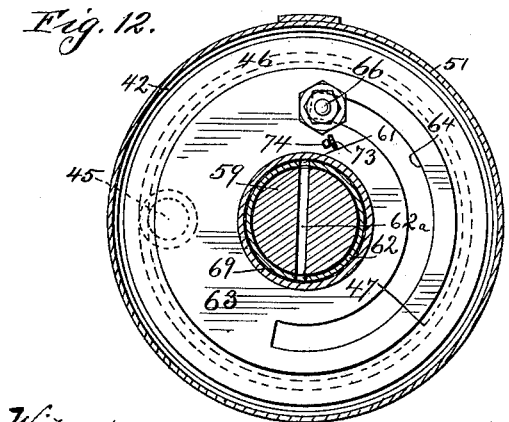
Figure 13:
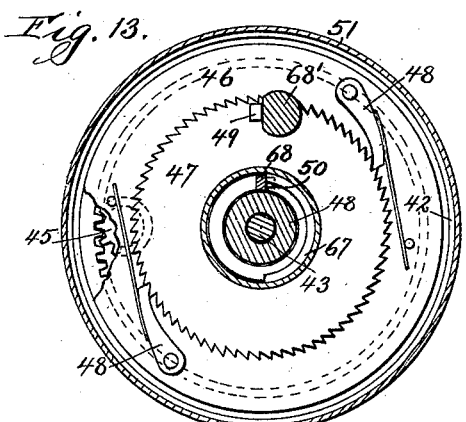
Figure 14:
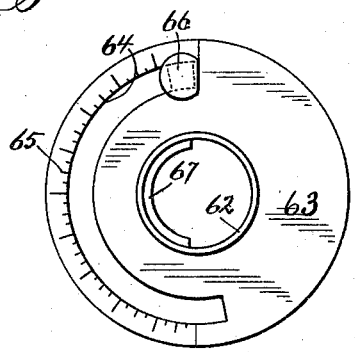
Figure 15:
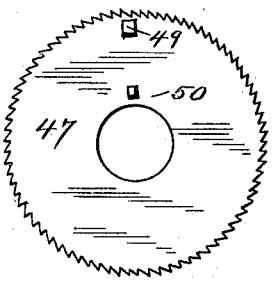
Figure 16:
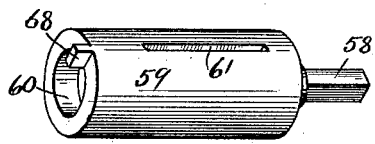
Figure 17:
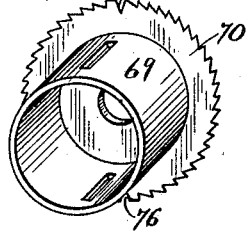
Figure 18:
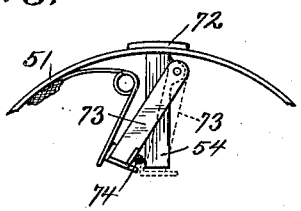

Figure 1 is a plan view as seen from the top, showing all parts of the gas-measuring mechanism. Fig. 2 is a longitudinal vertical section showing all parts of the measuring mechanism except the driving-shaft, cut on line 2 2, Fig. 1. Fig. 3 is a detail view of the valve-lever. Fig. 4 is a top view of the valve and opening into the supply-channel. Fig. 5 is a top view of the carriage-arm in contact with the tangent lever. Fig. 6 is a rear end view of the carriage, showing the ratchet and pawl and the bearing for the driving-shaft, on line 6, Fig. 5. Fig. 7 is a front end view of the carriage, showing the pin in contact with the side of carriage and the driving-wheels. Fig. 8 is a view of the index-dial, showing the consumer's scale and the indicating-point connected with my device. Fig. 9 is a front view of the coin-controlled mechanism, case and money-drawer, thumb-piece, and stops. Fig. 10 is a vertical longitudinal section of the coin-controlled mechanism, showing all parts. Fig. 11 is an inside vertical view of the cap, partially in section, on line 11 11, Fig. 10, showing the ratchet-wheel and pawls fixed to the outer sleeve and the coin-chute with the shutter and spring, also the slots in the coin-cylinders. Fig. 12 is a front view of the price-changing disk, showing the arc-shaped slot with index-bolt fixed in it, cut on line 12, Fig. 10. Fig. 13 is a front view of the master-wheel with a portion of its web cut away to show the small pinion and the ratchet-wheel journaled on the hub, also the stop with the index-bolt against it and the pawls fixed to the web of master-wheel, cut on line 13, Fig. 10. Fig. 14 is a rear view of the price-changing disk and the inner end of sleeve with the curved slot, also the graduated scale and index-bolt. Fig. 15 is a view of the large ratchet-wheel with lugs fixed thereon. Fig. 16 is a perspective view of the arbor. Fig. 17 is a perspective view of the outer sleeve with the ratchet-wheel fixed to the outer end. Fig. 18 is a detail of the shutter, showing the pin that is fixed to the price-disk to move it out of the way.

Similar numerals refer to similar parts throughout the several views.

I will now proceed to describe my invention, so that any one skilled in the arts will be enabled to construct it.

For the purpose of a clearer description I will divide the mechanism into two divisions, describing each and then connecting them— namely, the gas-measuring mechanism and money-receiving mechanism.

First. The gas-measuring mechanism is located on top of the table 1 of the gas-meter, between the point 2 of the gas-chest and the end wall of gallery, where the intake-pipe 5 is located. Beneath the table a channel 4 is fixed, extending from and connecting with the intake-pipe 5, having an opening 6 into the large gas-chest, where are located the slide-valves, which are a part of the meter proper. (Not shown.) Near the point of the gas-chest two apertures 7 7 are cut through the table 1 and into the above-mentioned channel 4. Between these apertures a partition 8 is fixed in the channel. The object of this partition is to cause the gas to flow up through the first aperture and down through the second one, as indicated by the arrows in Fig. 2. Immediately above the second opening into the channel a circular valve-seat 9, having three ports arranged radially from the hub, as seen in Fig. 4, is soldered to table 1. On top of the valve-seat a rotating valve 10, having ports to correspond with the seat, is placed. The rotary valve is provided with lugs 11 on opposite sides and a hub 12 in the center. A hole is drilled through the valve-hub and into the hub of valve-seat 9, but not through it. A valve-stem 14 is loosely fitted in these holes vertically, carrying two arms 15, fixed horizontally thereto opposite to each other. Pins 16 are placed in the outer ends of the arms, pointing downward and engaging the lugs 11 in the sides of the valve, which lies loosely on its seat. A cover 17 is then fitted over the valve, covering the first opening in the channel 7 and abutting against the point 2 of the main gas-chest soldered to the table 1, an aperture being provided for the valve-stem. In top of the chest a stuffing-box 18 is fixed around the valve-stem, a lever 19 being provided with a slot the whole length. The inner end of said slot is bent outwardly from the point of contact with the valve-stem (shown in Fig. 3) at an angle of sixty degrees. The lever is fixed to the stem at a right angle and parallel with the plane of the table. This lever actuates the valve, and when this valve is closed the gas is shut off from the meter, as will be hereinafter shown. A bracket 13 is fixed on top of the chest near the main gas-chest. Another bracket 20 is fixed to the inlet side wall of the gallery. These two brackets constitute the frame of the measuring mechanism. A shaft 21, having cogs or flutes on it extending its whole length and a journal at each end, the inner end being provided with a spur-wheel 22, is placed in the bearings in the frame prepared to receive it. The bearing in the inner bracket is made large enough to allow the shaft to pass through it, as shown in Fig. 6. The inner end journal is supported by a bracket 23, resting on the top of the main gas-chest. The spur-wheel 22 engages the worm 24 on the king-post 25, both the worm and king-post being a part of all gas-meters. The cogged shaft 21 I call the "driving-shaft." A feed-screw 26, having a given number of threads to the inch and journals at each end, is placed in the frame parallel with the driving-shaft and in the same plane, having a small cog-wheel 27 on the outer end and a ratchet-wheel 28 on the inner end, with a pawl 29, fixed to the bracket 13, designed to engage it and prevent it from turning in more than one direction. A yoke 30 is made by bending a piece of metal into a U shape, with bearings in the legs adapted to fit journals 31 on the hub of the wheel. A cog-wheel 32, having a hub provided with an internal screw-thread adapted to travel on the feed-screw, is placed between the legs of the yoke with the hubs in the bearings. The cogs on this wheel are designed to mesh into the cogs on the driving-shaft 21. On the leg of the yoke nearest to the king-post 25 a post 33 is fixed vertically, designed to intercept the tangent lever 34. The object of this is to prevent the gas from moving the meter if the small valve should leak. A finger 37 is fixed to the opposite leg, pointing downward, immediately under the feed-screw 26 and into the slot in the valve-lever 19. The object of this finger is to open and close the valve. An arm 35 is fixed to the inner leg of the yoke, extending diagonally to the front of meter to the index mechanism 36, where the end is bent downward over the dial (shown in Fig. 8) and operates as a pointer. An additional scale is printed on the dial 82, Fig. 8, and is called the "consumer's" scale, as by it he can always tell how many feet of gas remain to his credit. The device just described I call the "carriage."

The cog-wheel 27 on the outer end of feed-screw is actuated by a larger wheel 38, with a number of cogs calculated to drive the smaller wheel a given number of revolutions to one of itself. The large wheel is fixed to a shaft 39 by a pin, the shaft having one journal in the bracket 20 fixed to the gallery-wall. The other extends through the wall into the money-receiving mechanism. A pin 40 is fixed in the inner face of large cog-wheel, designed to act as a stop to prevent the carriage from being jammed against the bracket 20, the movement being so timed that when the last quarter has been deposited the pin 40 will come in contact with the yoke, as shown in Fig. 7. A base 41 for the money-receiving part is made circular, with a rim 42 around it half an inch high. The coin-receiving mechanism is secured to the base by any suitable means. A stud 43 is fixed rigidly to the center of the base. An aperture is prepared for the shaft 39, that protrudes through the gallery-wall connected with the delivering mechanism. A stuffing-box 44 is formed upon the back of the base over the above-mentioned aperture and is designed to prevent gas escaping as it surrounds said shaft 39, and on the end of the shaft a small pinion 45 is fixed. Said pinion has ten or more cogs on it. A master-wheel 46, with a given number of internal cogs, as the case may require, adapted to mesh with the smaller wheel and drive it, is placed on the stud 43 in mesh with the small wheel 45. A ratchet-wheel 47 is journaled on the hub of the master-wheel 48 and resting against the web. Two pawls 48, provided with springs, are fixed on the outer edge of the master-wheel, adapted to engage the ratchet-wheel. Two lugs 49 and 50 are fixed to the face of the ratchet-wheel, standing at a right angle with its plane. The smaller one, 50, is located near the hub and the larger one farther out on the same radial line, the object to be described hereinafter. A cylindrical case 51, large enough to slip over the rim on the base end and provided with two studs 52 on each end, those on the inner end adapted to engage the lantern-hooks in the rim, and a slot 53 on the top, prepared to receive the coin-chute 54, and a large aperture 55 opposite to the slot for the escape of the coin into the drawer 56. This case is attached to the base by the lantern-hooks. A cap 57 is provided with a rim having lantern-hooks adapted to engage the studs on the outer edge of the case and slip inside of said case. An aperture is provided in the center of the cap to receive the stem 58. An arbor 59 has one end 60 recessed to receive the hub 48 on the master-wheel. The other end has a stem 58. A long narrow slot 61 is formed centrally through the arbor. The slot is made shorter on one side than the other, (see $x$, Fig. 10,) to be explained more fully hereinafter. A cylindrical sleeve 62 is provided with a longitudinal slot $62^a$ to correspond with the slots in the arbor and to telescope on the arbor. An annular plate 63 is fixed on the sleeve one-eighth of an inch from the inner end. The plate 63 is provided with a curved slot 64, Figs. 12 and 14, around one-half of the circumference. The part of the plate outside of the slot has a scale 65 stamped thereon and is called the "price-regulating" scale. A stud-bolt 66 is adapted to slide in the slot and provided with a large flat head and a washer and a nut. A portion of the head is cut away on a radial line, to be more fully explained hereinafter. A curved stop 67 is fixed to the inside of the sleeve, extending around half the circumference back one-eighth of an inch from the edge of the sleeve. The inner edge of the arbor rests against it. A lug 68 is fixed to the rim on the end of the arbor and adapted to engage the ends of curved stop 67. A second sleeve 69, having slots on each side to correspond with the slots aforementioned and adapted to telescope on the first sleeve, is provided at the outer end with a ratchet-wheel 70. Said wheel is provided with a round aperture designed to receive the stem on the arbor. Two V-shaped indentations 76 are made in the periphery of the wheel opposite to the slots. Two pawls 71, provided with springs, are fixed to the inside of the cap. One of the pawls has a V-point designed to engage the V-indentation and hold the sleeve firmly. The other pawl is designed to engage the ratchets and prevent the sleeve from turning back after a coin has been dropped in the slot. A coin chute or tube 54 is fitted in the opening in the top of the case 51, with the lower end a little above the outer sleeve. It is provided with a shutter 73, pivoted on the edges of the tube, the bottom part being bent so as to fall under the end of the tube above the sleeve. The shutter is held in its place by a spring, or it may be weighted and gravity will hold it. The object of this shutter is to prevent anything being dropped into the slot until it has been moved away by a pin 74, projecting inwardly from the price-regulating plate, a lug being fixed to the side of the shutter for that purpose. A curved guard 75 is fixed to one side of the chute to prevent the coin from dropping out until it has reached the proper place.

The stem on the arbor 58 is squared to receive a knob or thumb-piece 79. A pin 80 is fixed to the outer face of the cap near the base of the thumb-piece. Two projections 81 are fixed to the base of the piece, one on each side, so arranged that the thumb-piece can be turned only half-way around. These stops 80 and 81 are set in such a manner that when they are against each other the slots will all be in a vertical position. I do not want to confine myself to the exact location for the stops described, as they may be placed on the inside of the cap if required.

The money-drawer 56 may be constructed in any form desired. I prefer the one shown in Fig. 9, having a rounded bottom, the body being nearly square in cross-section, with flanges 83 turned outwardly, adapted to slide in runways 84, fixed to the sides of the case. A lock 85 is fixed to the inside of the drawer. A bracket 86 is fastened to the under side of the case, having an aperture in the lower end for a screw. A nut 87 is soldered to the meter side. When the case is in its proper place, a screw is inserted to secure the case from turning. Two screws 89 are inserted through the under side of the outer end of the case. Into the cap-rim, to secure the cap from turning, a stud 90 is fixed to the wall of the meter a little below the nut, adapted to engage an aperture in back side of the drawer. This is to prevent the drawer from being pulled from the runways 84. When the drawer is locked in place, the three screws above mentioned cannot be molested. Thus the coin-controlled mechanism cannot be easily tampered with.

To operate this device, it is necessary to use a perfect United States twenty-five-cent piece. If a five-cent piece is dropped into the slot, it will instantly fall through the coin-cylinders into the money-drawer. Should the narrow side of the cylinder-slots be up, the shutter 73 will hold the coin until the right side is turned up. When the twenty-five-cent piece is dropped in, it falls into a cylinder-slot and rests on the shoulder, (shown by dotted line in Fig. 10,) the coin projecting through the arbor into the slots in the sleeves. When the coin is in this position, if the thumb-piece is now turned to the left the coin-holding mechanism turns with it. The bolt-head 66 on the price-changing disk engages the lug 49 on the ratchet-wheel, which, being held in position by the pawls on the face of the master-wheel 48, turns with it, causing the intermediate wheels to turn the feed-screw 26. The driving-shaft being held stationary by the worm on the king-post, the wheel in the carriage cannot turn, and hence the feed-screw draws it forward one-quarter of its length for each twenty-five-cent piece dropped in the slot, the finger moving in the slot in the valve-lever keeping the valve open, the index-arm 35, moving forward with the carriage, indicating on the dial the amount of gas paid for until the limit of the screw has been reached, when one thousand or more feet, according to the size of meter, is paid for. This mechanism is calculated for a five-light meter and one thousand feet of gas at a price from one dollar to three dollars and fifty cents. To increase the capacity of the meter, increase the length of feed-screw and the size of the spur-wheel on the driving-shaft engaging the worm on the king-post. To change the price, remove the case from the meter and withdraw the price-disk, loosen the index-screw 66, move it to the left, setting the edge of the head at the price desired, as indicated on the scale. Each division is equal to twenty-five cents, the subdivisions five cents. Set the nut on the bolt firmly. Return it to its place in the case, taking care to have the first line on the index-disk perpendicular with the slots, the lug on the ratchet-wheel 49 also perpendicular with the slots, but in advance of the index-bolt. The operation is thus: The index-bolt having been set back on the disk, the slots all in line, and the coin dropped in, when the cylinders are turned the index-bolt will travel the distance it has been set back before it comes in contact with the lug on the ratchet-wheel without moving the master-wheel, and when in contact it will cause it to move a less distance. If the index-bolt were placed at the limit in the slot in price-disk, it would turn back and forth without disturbing the master-wheel. After having turned the master-wheel and stored up the gas paid for by the twenty-five-cent piece the motion of the thumb-piece is reversed, the stop on the end of arbor 68 coming in contact with the small pin 50 in the ratchet-wheel 47 and the curved stop 67 in the end of the index-cylinder and bringing them all in line with the slots. At the same time the small pin 74 in the index-disk 63 engages the shutter 73 and pushes it out of the way, the stops on the thumb-piece preventing the cylinder from being turned more than half-way around, and the curved guard 75, fixed to the coin-chute, prevents the coin from falling out of the slots before it reaches the proper point. When the gas paid for has been exhausted, the carriage will be at the end of the screw and the finger traveling in the slot in the lever will have closed the valve. The vertical post on the carriage will intercept the tangent-lever and prevent any movement of the lever until a coin has been dropped in and the valve opened.

The letters $c$ $c$ indicate the links attached to the bellows. The letter $b$ indicates the frame supporting the king-post. The letter $f$ indicates the spur-wheel that actuates the company's index. $a$ represents the gallery-walls of the meter.

I am aware that feed-screws in prepayment-meters to actuate the valve-closing mechanism are not new, and I do not claim them, broadly. Neither do I claim the application of gearing-wheels to get the speed required. Neither do I wish to confine myself to the specific form for the yoke nor the method of making it described herein.

Having described my invention, what I claim, and wish to secure by Letters Patent, is—

1. In a coin-controlled gas-meter, the combination of the rotary valve fixed to a gas-meter, the fork connected to the valve-stem, said valve and fork inclosed in a covered chamber provided with means for admitting gas, the valve-stem fixed to a horizontal lever provided with a longitudinal slot, a portion of said slot turned outward at an angle of sixty degrees; substantially as described.

2. In a coin-controlled gas-meter, the combination of a feed-screw having a gear-wheel on the outer end and a ratchet-wheel on the other end, a pawl for engaging the ratchet-wheel, said screw set in a frame fixed in a gas-meter; a worm-gear fixed to a king-post; a fluted driving-shaft having a spur-wheel fixed at the inner end adapted to engage said worm-gear; a carriage having a gear-wheel provided with a hub said hub having an internal screw-thread adapted to move on said feed-screw; the cogs of said wheel adapted to mesh with the flutes on the driving-shaft and slide thereon; an indicating-arm connected and carried by said carriage; a slotted lever arranged parallel with said feed-screw; and a downwardly-extending finger carried by said carriage and adapted to engage said slotted lever.

3. The combination in a coin-controlled gas-meter, of a case-base, a stud carrying a wheel and fixed to said base and provided with a check-pin, a shaft extending into the gallery of the meter, a pinion fixed to said shaft and adapted to be engaged by said master-wheel, a cog-wheel fixed to the inner end of said shaft, a feed-screw carrying a pinion adapted to be meshed by said cog-wheel, and a carriage adapted to be engaged by said check-pin.

4. In a coin-controlled gas-meter, the combination of a base, a wheel secured to said base, a ratchet-wheel journaled on the hub of said master-wheel, said ratchet-wheel having two lugs set in its face on a radial line, and two pawls provided with springs fixed to the side of the master-wheel, adapted to engage the teeth of said ratchet-wheel.

5. In a coin-controlled gas-meter, a price-changing annular disk, having a curved slot, a graduated price-scale arranged beside said slot, an indicating-bolt adapted to slide in said slot having one side of its head flattened, a lug adapted to be engaged by said bolt carried by the ratchet-wheel, a shutter adjacent to the slot, a pin fixed in the disk adapted to engage said shutter, a sleeve, said annular disk fixed circumferentially to said sleeve, said sleeve provided with longitudinal slots in opposite sides, and an arbor surrounded by said sleeve and provided with an internal curved stop.

6. In a coin-controlled gas-meter, an arbor having a centrally-located longitudinal slot made shorter on one side by an internal offset $x$, a recess in the rear end, a stem on the front end, a lug fixed to the rim around the recess, a master-wheel, said recess adapted to turn on the hub of said master-wheel, and a sleeve surrounding said arbor which is adapted to rotate in said sleeve, and said sleeve being provided with a curved slot adapted to be engaged by the lug of the arbor.

7. In a coin-controlled gas-meter, an arbor provided with slots, an outer sleeve provided with two longitudinal slots, an inner sleeve provided with slots and adapted to be telescoped by the outer sleeve both sleeves surrounding the arbor, the slots in the inner sleeve, in said arbor and in the outer sleeve coinciding, and a ratchet-wheel having two V-shaped indentations in its periphery carried upon one end of said outer sleeve.

8. In a coin-controlled gas-meter, a cylindrical case in combination with a base, a cap having two pawls provided with springs and fixed to the inner surface of the cap, a ratchet-wheel engaged by both of said pawls and carried by said sleeve, an outer sleeve, one of said pawls provided with a V-shaped point adapted to engage the V-indentations in said wheel, a pin fixed to the outer surface of said cap, another sleeve surrounded by said outer sleeve, an arbor surrounded by said sleeves, a thumb-piece provided with stops, a bracket fixed to said case, a nut fixed to the wall of the meter adapted to receive a screw, a coin-chute fixed vertically and longitudinally in the top of said case, and its inner end coinciding with slots in the sleeves and arbor, a shutter adapted to close the lower end of the chute, a coin-guard fixed to one side curved around the sleeves and arbor, and the money-drawer adapted to slide in grooves to receive a stud fixed to the wall of the meter, said drawer being provided with a lock.

9. In a coin-controlled gas-meter, the combination of a thumb-piece provided with stops fixed in the base of said piece, a cap carrying a pin adapted to be engaged by said piece, a slotted arbor secured to said piece and adapted to be rotated therewith, and telescoping sleeves having corresponding slots and adapted to surround and revolve with said arbor.

J. HOWARD BISHOP.

Witnesses:
H. E. EVANS,
M. H. BISHOP.